May 26, 1959
R. WILTON
2,888,534
SENSITIVE METER-TYPE RELAY
Filed March 1, 1957
2 Sheets-Sheet 1
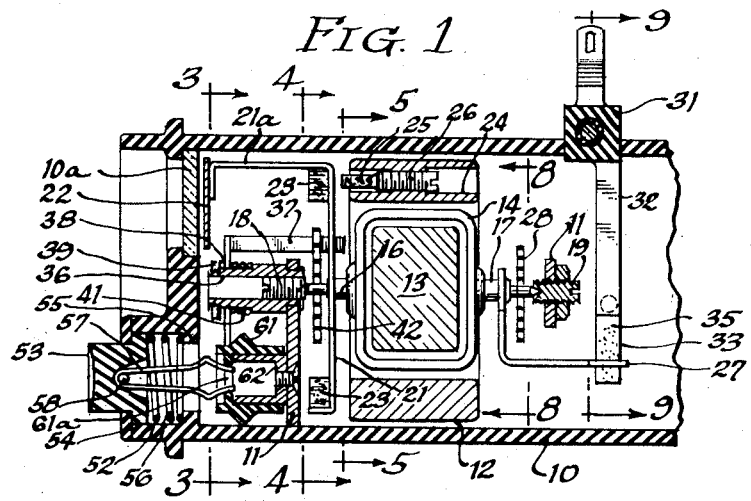
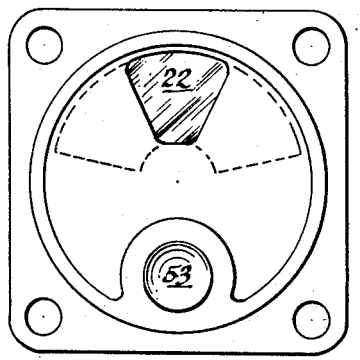
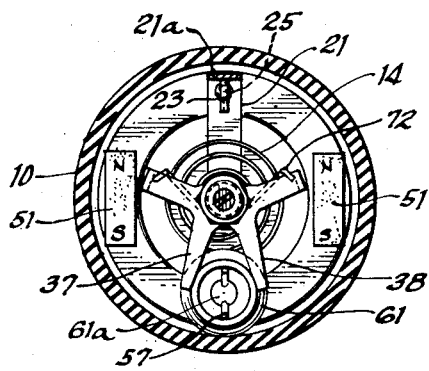
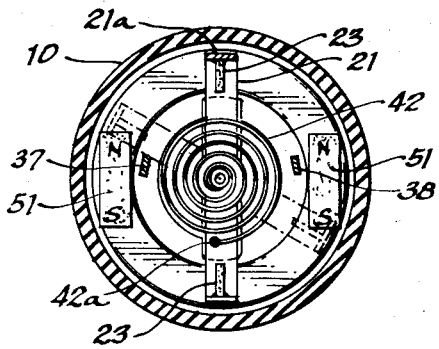
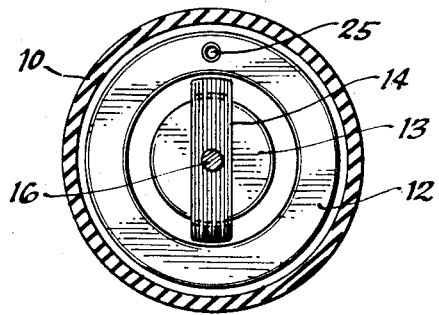
INVENTOR.
Robert Wilton
BY
Oome, McDougall, Williams & Hersh
Attorneys May 26, 1959
R. WILTON
2,888,534
SENSITIVE METER-TYPE RELAY
Filed March 1, 1957
2 Sheets-Sheet 2
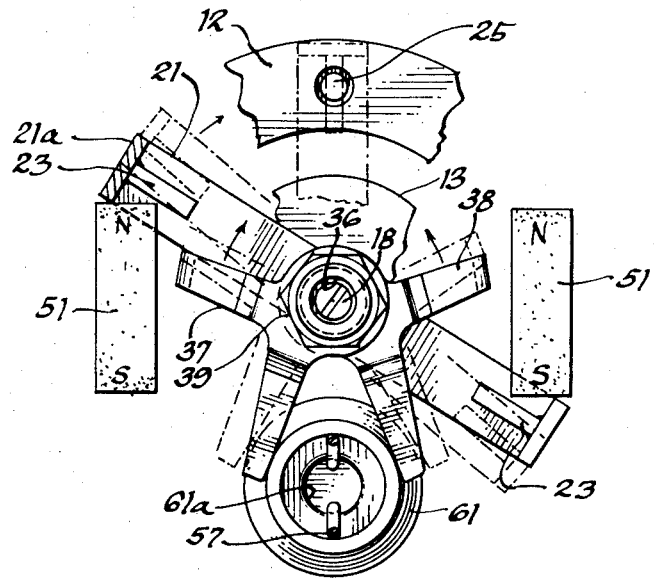
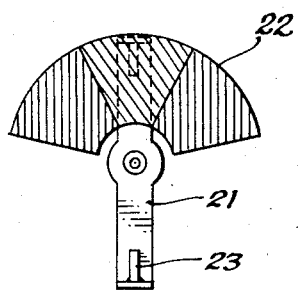
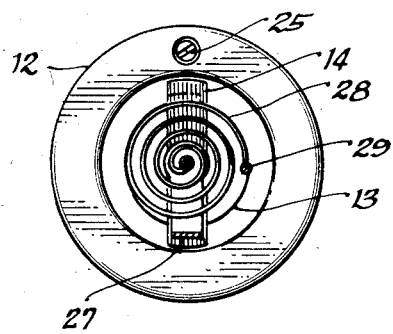
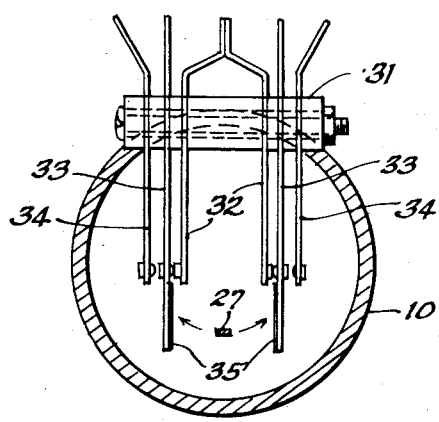
INVENTOR.
Robert Wilton
BY
Ooms, McDougall, Williams & Hersh
Attorneys

United States Patent Office 2,888,534
Patented May 26, 1959

2,888,534

SENSITIVE METER-TYPE RELAY

Robert Wilton, London, Ontario, Canada, assignor to American Gage & Machine Company, a corporation of Illinois Application March 1, 1957, Serial No. 643,422

6 Claims. (Cl. 200—110)

This invention relates to the field of electrical relays and is particularly directed to a sensitive relay of the type employing a D'Arsonval meter movement, particularly adapted for use as an overload relay.

In many applications, and particularly in laboratory work, expensive and delicate electrical test equipment is used in situations where there is danger of overloading it. This is particularly true when tests are being made on newly built apparatus whose electrical characteristics are not yet fully determined.

Under such circumstances, it is highly desirable that some means be provided for protecting such test equipment against the damage or destruction which might result from exposure to an excessive load for any appreciable period of time. Such a protective device, however, must not subject the circuits under test to any substantial additional load, over and above that imposed by the test equipment itself.

It is the primary object of the present invention to provide a sensitive overload relay which will provide positive protection for delicate electrical equipment while itself consuming a negligibly small quantity of energy from the circuits to which it is connected.

Another desirable object achieved by the present invention is the provision of an overload relay which, while consuming only a minute quantity of electrical energe, nonetheless provides, by means of magnetic biasing a substantial amount of torque with which to actuate relay contacts and to hold such contacts in a desired position.

Still another important object of the present invention is to provide, in an overload relay of the type under consideration, a manual reset mechanism which will achieve reset of the relay in the event the overload condition has been removed at the time the mechanism is actuated but which possesses the desirable property of instantly reopening the circuit in the event the overload condition still exists. This feature is of the greatest practical importance, since with conventional overload protective devices there is great danger of damaging delicate equipment by manually resetting the protective device while the overload condition still exists and thereby subjecting the equipment to overload for at least the period of time manual force is being applied to the reset mechanism. In the present invention, actual application of resetting force to the overload relay is momentary, no matter how long manual force is applied to the reset button.

Other objects and advantages of the present invention will be evident from the following detailed description of a typical embodiment thereof.

In its preferred form, my invention employs a moving-coil movement of the D'Arsonval type. Such movements, with present-day refined manufacturing techniques, can be made extremely sensitive, and are hence especially well adapted for this application. Further, in the interest of compactness and physical ruggedness, I prefer that my instrument be incorporated in a cylindrical housing generally similar to a conventional meter case.

The details of a preferred embodiment of my invention are shown in the appended drawing. In the drawing Figure 1 is a sectional view taken along the axis of the casing. Fig. 2 is a front elevational view of the casing, showing the indicating window of the instrument. Fig. 3 is a transverse sectional view through the casing taken along the line 3—3 of Fig. 1. Fig. 4 is a similar sectional view taken along the line 4—4 of Fig. 1. Fig. 5 is likewise a transverse sectional view of the instrument, taken along the line 5—5 of Fig. 1. In all of Figs. 3, 4, and 5, the view is taken in the direction looking toward the back of the instrument casing. Fig. 6 is an enlarged fragmentary view, partly in section, bringing out some of the details of the magnetic biasing arrangement and the reset mechanism. Fig. 7 is a framentary view in elevation showing the indicating flag. Fig. 8 is a transverse sectional view taken along the line 8—8 of Fig. 1, looking forward from the rear of the instrument toward the face. Fig. 9 is a transverse sectional view along the line 9—9 of Fig. 1, looking toward the rear of instrument and showing the relay contacts and the manner of their actuation by the moving coil mechanism.

Referring now to Fig. 1, I show the instrument housed in a cylindrical casing 10 which may be formed of molded hard rubber, plastic or other suitable material. The various parts of the instrument within the housing 10 are mounted on a frame 11, normally of non-magnetic metal, which, for the sake of clearness, is largely cut away in the drawing. Since the supporting frame and the manner of mounting the various parts of the instrument thereon is conventional in moving-coil meters and forms no part of this invention per se, a detailed disclosure thereof in the drawing is unnecessary.

Suitably mounted about midway of the housing 10 I provide a conventional yoke 12, which may be made of soft iron or other magnetic material, yoke 12 being cylindrical in shape and being mounted coaxially with the housing 10. A core magnet 13, conventionally consisting of a cylindrical permanent magnet jacketed with a pair of soft iron pole pieces, is suitably mounted centrally of the yoke 12 and coaxial therewith, the core magnet being suitably supported on the frame 11 by means of projecting lugs (not shown). Within the annular space between the yoke 12 and the core magnet 13 a movable coil 14 is mounted, such coil consisting of many turns of fine wire wound on a form of essentially rectangular section. The moving coil 14 is provided with a pair of supporting shafts 16 and 17, disposed coaxially relative to the core magnet 13 and terminating in pivots which are received within suitable bearing elements 18 and 19 carried on frame 11. Conventionally the bearing elements 18 and 19 may be provided with jewel bearings for receiving the pivots, so as to provide a low-friction rotary mounting for the moving coil 14.

All the structure just described is conventional in moving-coil meters and does not, per se, form a part of the present invention.

An arm 21 is rigidly mounted on shaft 16 in front of the coil 14, the arm extending above and below the central axis of the instrument and having at its upper end a forward extension 21a which supports an indicator flag 22, to be described in greater detail in a subsequent paragraph hereof. A pair of soft iron vanes 23 are secured edge-on to the forward face of arm 21 at equally spaced distances above and below the shaft 16, as may be seen from Figs. 1 and 4.

An axially directed bore 24 in yoke 12, directly above the shafts 16 and 17, carries a small permanent magnet 25, magnet 25 being affixed to the end of a screw 26 which is threadedly carried in the central portion of bore 24, the bore being in that region threaded to cooperate therewith. As will be hereinafter explained, magnet 25 cooperates with the upper vane 23 to provide a centering force for the arm 21.

At the rear of the moving coil, the shaft 17 carries rigidly affixed thereto a contact-actuating arm 27 which, in its normal position, extends below the shaft 17 and then extends backwardly as shown in Fig. 1. One end of torsion hair spring 28 is anchored to shaft 17, its other end anchored on an insulated pin 29 suitably mounted on frame 11. (See Fig. 8.) A similar hair spring 42 is mounted on the end of shaft 16 and is anchored to a similar pin 42a. These hair springs are balanced to produce a minimum amount of torque on the coil assembly, since their primary purpose is to provide a path for current into coil 14.

Suitably supported on an insulating block 31 is a group of relay contacts comprising a pair of inner contacts 32, shown in the drawing as electrically connected together, a pair of movable contact arms 33, and, optionally, a pair of outside contacts 34.

In the drawing, for the sake of simplicity, the contact-carrying block 31 is shown as mounted in a slot provided on the upper surface of housing 10.

It will of course be understood that the block 31 and the contacts which it carries may if desired be mounted wholly within the contour of the casing 10 with lugs or other suitable electrical connecting means being brought out through the housing at any desired point.

The contact arms 32, 33, and 34 are preferably made of resilient metal strip of the sort conventional in the relay art. In the embodiment of the invention shown, the arms 33 are biased so as to bear normally against, and make electrical contact with, the contact arms 32. Because of their resiliency, however, either of the arms 33 can be moved away from its corresponding arm 32 and into contact with the outside contact or stop member 34 situated behind it.

As may be seen from Figs. 1 and 9, the outer end of arm 27 passes between the lower ends of the contact arms 33, in such position that the arm 27 will engage one or the other of the contact arms 33 when arm 27 rotates through a predetermined arc in either direction from its normal rest position. Since arms 33 will normally be made of metal, the facing edges of the contact arms 33, in the area adjacent the arm 27, will normally be covered by a thin layer of insulating material 35.

On opposite sides of the instrument, positioned symmetrically with respect to biasing magnet 25, I provide a pair of strong permanent bar magnets 51, fixedly mounted on the frame in any desired fashion. These magnets contribute the major portion of the contact-actuating force required for displacement of the respective relay arms 33. The magnets 51 are preferably proportioned in size and oriented so as to achieve full cooperation with the soft iron vanes 23 carried by arm 21. As may be seen from Fig. 4, the magnets 51 can be so arranged that when the arm 21 is at maximum deflection in either direction the vanes 23 are both in contact with one of the magnets. By this arrangement, the force of both magnets is effective in urging the arm 21 to its extreme position, and in holding it there, no matter in which direction the arm 21 is rotated from its normal rest position. The magnets 51 may be made of any suitable material, although I prefer magnets made from one of the highly magnetic alloys such as "Alnico," since they are strikingly powerful for their size. If desired the magnet poles may be coated with a thin layer of plastic or other material to leave a small gap between the magnets and the vanes when the arm 21 is in fully deflected position.

I shall now describe the novel means by which I achieve resetting of the relay after an overload has taken place.

On a boss 36 extending forwardly from the frame 11 I provide a pair of rotatably mounted scissors elements 37 and 38, respectively journaled on the boss. They may be held on the boss in any desired manner, as by lock nut 39. Since the scissors elements 37 and 38 undergo relative rotational movement in a manner to be hereafter described, it is necessary that they be mounted on the boss 36 in a manner permitting such movement. In the illustrated embodiment this is accomplished by journaling the scissors elements on a reduced-diameter portion of the boss 36 and providing a coiled compression spring 41 seated on such reduced-diameter portion behind the scissors elements and exerting force forwardly on the scissors elements against the lock nut 39. By this arrangement the scissors elements are held in position axially of the boss while being left free to rotate upon application of a relatively small force.

The configuration and arrangement of the scissors elements can best be understood by reference to Figs. 3 and 6.

As will be observed from a study of those figures, each of the scissors elements has a downwardly depending projection and an upper projection which extends laterally from the boss on the same side thereof as the downwardly depending arm. The laterally extending arm of each of the elements 37 and 38 is provided at its outward extremity with an extension bent at right angles to the plane of the element proper and extending backward toward the arm 21 in a direction generally parallel to the axis of the instrument. Between these backwardly projecting extensions on the scissors elements 37 and 38 a torsion spring 72 is seated, the force of the spring tending to force the backward extensions of the elements 37 and 38 apart and thus tending to push the downwardly projecting portions of the scissors elements together. This condition is shown in Fig. 3.

On the face of the casing 10 I provide a cylindrical guideway 52, within which a manual reset button 53 is carried. Button 53 is provided with an annular shoulder which, in cooperation with cap member 54 at the outer end of guideway 52, limits the button's outward movement, it being otherwise free to slide forward and backward in the guideway. Cap 54 may be secured in position in any desired manner, as by cementing.

Guideway 52 terminates at its rear end in an inwardly extending annular shoulder 55, a coiled compression spring 56 being carried within the guideway and being seated at its respective ends on the shoulder 55 and the rear face of button 53.

A resilient U-shaped spring member 57 is mounted within a suitable recess in the back face of button 53 by means of a transverse pin 58, the legs of the member 57 extending backwardly through the guideway 52 and into the interior of the instrument casing. The rear portions of the legs of element 57 are modified to provide a generally diamond-shaped contour, as shown in Fig. 1. As will be presently explained, this diamond-shaped contour provides a double-acting control device governing the movements of the sliding cam 61 to be described presently. The spring element 57 is formed of a suitable resilient material such as steel wire and is sufficiently flexible that its leg portions may be pressed together on application of appropriate force, although they normally hold the shape shown in Fig. 1.

The sliding cam 61, best seen in Figs. 1, 3, and 6, rides on a boss 62 mounted on the frame 11 and extending forwardly thereof in coaxial alignment with the button 53. Cam 61 is generally cylindrical shaped but is provided on its outer surface with an annular cam surface of diamond-shaped cross section. The front face of cam 61 is partially closed off but contains a central aperture 61a large enough to permit passage of the spring element 57 therethrough when the legs of element 57 are squeezed together.

As may be seen best from Figs. 3 and 6, the scissors members 37 and 38 already described press upon the outer surface of cam 61. When the cam is in its normal position, as shown in Figs. 1 and 3, the scissors elements 37 and 38 are in contact with the smaller-diameter portion of the cam. Forward movement of the cam 61, however, will cause the scissors members to ride up onto the diamond-shaped cam surface, being thereby forced apart in the manner indicated by the dotted portions of Fig. 6.

In the foregoing description of a typical embodiment of my relay, I have not discussed the electrical connections to the coil 14, since they are conventional. It should be understood that, consonant with routine practice in the art, the coil 14 has its respective terminals connected electrically through the hair springs 28 and 42 to suitable means for making external circuit connections thereto. In a subsequent paragraph, I shall discuss typical circuit arrangements involving the coil 14 and the relay contacts carried by block 31.

The indicator flag 22, as may be best seen in Fig. 7, is provided on its forward face with three arcuate zones, the central one of which is preferably colored green and the other two of which are preferably colored red. When the arm 21 is in its normal vertical position, the green sector of the flag 22 is visible externally of the instrument through window 10a. On movement of arm 21 to its maximum angular displacement in either direction, the green sector of flag 22 will disappear entirely from window 10a and be replaced by one or the other of the red sectors.

Operation

Persons familiar with the art, on reading the foregoing description of my invention, will realize that the moving-coil mechanism which I employ in my relay is essentially a conventional D'Arsonval meter movement. When no current is passing through coil 14, the coil and its associated arms 21 and 27 will occupy their normal positions as shown in Figs. 1, 3, and 9, being held there by the biasing magnet 25. Upon passage of current through coil 14, however, a torque will develop which will tend to rotate the coil 14 and the arms 21 and 27, the direction of such rotation depending on the direction of the current through the coil.

As will be well understood by persons skilled in the art, the quantity of current necessary to produce a given degree of rotation will be a matter of design. Meter movements are now available which will produce full-scale deflection with coil currents of 50 micro-amperes. Sensitivity to be sought in designing any given embodiment of my relay will depend upon the application for which it is intended and may lie anywhere within the normal range of sensitivities used in D'Arsonval meter movements.

In its normal application, my relay will be connected in circuit with the apparatus to be protected in such a manner that the current being fed to the apparatus to be protected, or some predetermined fraction thereof, is likewise fed through the coil 14. At the same time, the external circuit supplying current to the apparatus to be protected is routed through the relay contacts in block 31.

On reference to Fig. 9, it will be noted that the innermost pair of relay contacts 32 are normally connected together, and the movable contact-carrying arms 33 are normally in touching relation to the arms 33. As a result, the contacts 33 may be connected in series with the circuit to be protected, so that normally such circuit is closed through the contact pairs 32, 33. The outermost contact pair 34 need not be used if the only objective of the relay is to open the protected circuit in the event of overload. If establishment of some branch circuit in the event of overload is desired, that can be accomplished in an obvious way by using the contacts 34.

Now let us assume that the relay is connected in the manner described, with the circuit to be protected being routed through the contact pairs 32, 33 and with all or a predetermined fraction of the external-circuit current being also fed through the coil 14. As current flows through coil 14, a force will be developed tending to rotate the coil and its associated arms. Such rotation, however, will be resisted by the magnetic influence of the biasing magnet 25 operating on one of the vanes 23. The amount of such force from magnet 25 will depend on its physical position, subject to adjustment by movement of screw 26.

When the current 14 becomes sufficiently great to overcome the force exerted by magnet 25, the coil 14 and its associated arms 21 and 27 will rotate sharply in one direction or the other, depending on the sense of the current through the coil. Once rotation of the coil 14 begins, the effect of magnet 25 immediately becomes negligible, since vane 23 at once moves out of the zone of influence of the magnet 25.

Such rotation, however, will instantly bring the vanes 23 into the range of influence of the magnets 51, which will reinforce the torque produced by the current through the coil and bring the arm 21 over to the position of full deflection shown in Fig. 6, whereat the vanes 23 are in touching relation with the magnets 51. At the same time the arm 27 will strike one or the other of the contact arms 33 and will move it away from its neighboring arm 32 and against the outer contact or stop member 34. The force with which arm 27 will strike contact arm 33 and hold it away from its normal position will be controlled by the power of magnets 51 and may be amply more than enough to overcome the spring force inherent in the resilient arm 33.

Movement of either contact arm 33 away from its companion arm 32 will instantly break the circuit being protected and will thereby prevent damage to any delicate instruments that may be connected in such circuit.

When the moving parts of the instrument shift to their deflected position, the indicating flag 22 will of course also rotate and the green indication visible in window 10a will be replaced by a red indication, signifying that an overload has occurred.

Now suppose the operator believes the overload has been removed and therefore desires to reset the instrument. He presses on button 53. This causes the spring member 57 to enter the aperture 61a. Normally the cam 61 is held in the retracted position shown in Fig. 1, but when the widest portion of spring member 57 has passed through the aperture 61a, the direction of the spring force on cam 61 is reversed, and the cam accordingly moves sharply to the left, as viewed in Fig. 1. As this movement occurs, the diamond-shaped cam surface of element 61 forces the scissors elements 37 and 38 apart, as indicated in the dotted portion of Fig. 6, and one of the backward extensions of the scissors mechanism engages arm 21. (Which one of the scissors elements will engage arm 21 will of course depend on which direction arm 21 has been deflected.) The vanes 23 are thus pulled away from the magnets 51, and the arm 21 is given a smart impact tending to return it to its central position. If the overload has in fact been removed, the arm will return to the zone of influence of the magnet 25, and the operation of the circuit will continue normally until another overload occurs.

If, on the other hand, the overload is still present, the coil 14 and arms 21 and 27 will at once return to their overload position, with the vanes 23 in contact with the magnets 51 and with the circuit broken by engagement of arm 27 against one of the movable contacts 33.

It is important to note that this reopening of the circuit will occur even though the operator's finger may still be pressed on the reset button 53, for the reason that the resetting movement given to the scissors elements by cam 61 is momentary, the cam 61 passing on to the left after such movement and taking up a temporary rest position with the diamond-shaped cam surface on the left side of the scissors elements as viewed in Fig. 1. When the operator removes his finger from the reset button, the coil spring 56 will return the button to its normal position, pulling spring member 57 out of the aperture 61a and causing the cam 61 to return to its normal position as shown in Fig. 1. This will result in another momentary resetting movement. If the overload was off the instrument at the time the button was initially pressed, the second resetting movement will have no effect whatever on the instrument, since at that time the arm 21 will be in its normal vertical position. If, on the other hand, the overload was still present when the button was first pressed, the second resetting movement occasioned by release of the button will again momentarily close the circuit. If at this time the overload is gone, the instrument will return to normal operating condition. If the overload still remains, the circuit will again be broken after the briefest instant of reestablishment.

From the foregoing description, it will be apparent that with my relay overload conditions cannot be imposed on the circuit being protected for more than a brief instant at a time. That is, the instrument on reset will "check" the circuit momentarily but will restore it permanently only if the overload conditions no longer exist.

While I have in this specification described in considerable detail a typical embodiment of my invention, it is to be understood that the description is illustrative only and that the scope of my invention is to be determined primarily by reference to the appended claims.

I claim:

1. In a meter-type sensitive relay, a D'Arsonval movement comprising a rotatable shaft and coil assembly, said movement comprising means whereby said shaft and coil assembly has a normal rest position and is rotatable through a predetermined arcuate locus of movement, a relay mechanism having at least one pair of contacts adapted for connection to an external electric circuit, relay-actuating means carried by said assembly oriented relative to said relay mechanism to engage and actuate said contacts when said coil and shaft are at the end of said arcuate locus, magnetically permeable means carried by said assembly, a first magnet positioned near said locus of movement, whereby said permeable means is within the range of attractive force of said magnet when said assembly is in said rest position, a second magnet positioned near one end of said locus whereat it is in intimate magnetic relation with said permeable means when said assembly has rotated to said end position of said locus, whereby the magnetic force of said second magnet on said permeable means is operative to hold said assembly in said contact-actuating position, and a manual reset mechanism for disengaging said permeable means from said second magnet and restoring said assembly to its normal rest position, said reset mechanism comprising a manually actuatable member, a movably mounted mechanical element operative when actuated to bear against said assembly when said permeable means is in magnetic relation with said magnet and to urge said assembly back toward its normal rest position, and force-transmitting means operative responsively to manual force applied to said manually actuatable member to actuate only momentarily said mechanical element, and to release the same immediately after such momentary actuation even though such manual force continues to be applied.

2. In a meter-type sensitive relay, a D'Arsonval movement comprising a rotatable shaft and coil assembly, said movement comprising means whereby said shaft and coil assembly has a normal rest position and is rotatable through a predetermined arcuate locus of movement, a relay mechanism having at least one pair of contacts adapted for connection to an external electric circuit, relay-actuating means carried by said assembly oriented relative to said relay mechanism to engage and actuate said contacts when said coil and shaft are at the end of said arcuate locus, magnetically permeable means carried by said assembly, a first magnet positioned near said locus of movement, whereby said permeable means is within the range of attractive force of said magnet when said assembly is in said rest position, a second magnet positioned near one end of said locus whereat it is in intimate magnetic relation with said permeable means when said assembly has rotated to said end position of said locus, whereby the magnetic force of said second magnet on said permeable means is operative to hold said assembly in said contact-actuating position, and a manual reset mechanism for disengaging said permeable means from said second magnet and restoring said assembly to its normal rest position, said reset mechanism comprising a manually actuatable member, a movably mounted mechanical element operative when actuated to bear against said assembly when said permeable means is in magnetic relation with said magnet and to urge said assembly back toward its normal rest position, and force-transmitting means comprising a cam element and a cam-follower element, one of said elements being connected to said manual member and the other of said elements being connected to said mechanical element, said elements being mounted for relative movement upon application of force to said manual member whereby, upon such application of manual force, said cam overrides said cam follower to produce only momentary actuation of said mechanical element even though said manual force continues to be applied.

3. In a meter-type sensitive relay, a D'Arsonval movement comprising a rotatable shaft and coil assembly, said movement comprising means whereby said shaft and coil assembly has a normal rest position and is rotatable through a predetermined arcuate locus of movement, a relay mechanism having at least one pair of contacts adapted for connection to an external electric circuit, relay-actuating means carried by said assembly oriented relative to said relay mechanism to engage and actuate said contacts when said coil and shaft are at the end of said arcuate locus, magnetically permeable means carried by said assembly, a first magnet positioned near said locus of movement, whereby said permeable means is within the range of attractive force of said magnet when said assembly is in said rest position, a second magnet positioned near one end of said locus whereat it is in intimate magnetic relation with said permeable means when said assembly has rotated to said end position of said locus, whereby the magnetic force of said second magnet on said permeable means is operative to hold said assembly in said contact-actuating position, and a manual reset mechanism for disengaging said permeable means from said second magnet and restoring said assembly to its normal rest position, said reset mechanism comprising a manually actuatable member, a movably mounted mechanical element operative when actuated to bear against said assembly when said permeable means is in magnetic relation with said magnet and to urge said assembly back toward its normal rest position, and force-transmitting means operative to actuate only momentarily said mechanical element responsively to manual force applied to said manually actuatable member, said normal rest position of said assembly being situated midway between the ends of said arcuate locus, said assembly being arranged to engage and actuate said relay mechanism upon rotation of said assembly to either of the ends of said arcuate locus.

4. Apparatus according to claim 3 wherein said permeable means comprises an arm fixed on said shaft at its midpoint and provided at its opposite ends with a pair of vanes made of magnetic material, said second magnet being so positioned that movement of said assembly to one end of said arcuate locus will bring said magnet into intimate magnetic relation with one of said vanes and movement of said assembly to the other end of said arcuate locus will bring the other of said vanes into intimate magnetic relation with said magnet.

5. Apparatus according to claim 4 provided also with a third magnet positioned symmetrically with respect to said second magnet near the opposite end of said locus, whereby movement of said assembly to either end of said arcuate locus will bring one of said vanes into intimate magnetic relation with said second magnet and the other of said vanes into intimate magnetic relation with said third magnet.

6. Apparatus according to claim 5 wherein said force-transmitting means comprises a scissors mechanism and a cam, substantially as shown and described, said scissors mechanism having one pair of projections adapted for cooperation with said cam and another pair of projections disposed adjacent the ends of said arcuate locus, said cam being positioned for movement responsively to application of manual force to said manual member and said scissors mechanism being operative on engagement with said cam to traverse a portion of said arcuate locus to reset said assembly when said assembly is at either end of said locus, said cam being formed to override said first pair of projections responsively to continued application of force on said manual member.

References Cited in the file of this patent

UNITED STATES PATENTS 2,565,312  Lamb _____ Aug. 21, 1951